(12) United States Patent
Loudon et al.

(10) Patent No.: US 6,438,483 B1
(45) Date of Patent: Aug. 20, 2002

(54) SYSTEM AND METHOD FOR VEHICLE STABILITY ENHANCEMENT CONTROL DURING ABS OPERATION

(75) Inventors: Steven P. Loudon, Howell; Kevin A. O'Dea, Ann Arbor, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,689

(22) Filed: Jan. 3, 2001

(51) Int. Cl.[7] .................................................. B60T 8/00
(52) U.S. Cl. ........................ 701/71; 701/48; 303/152; 303/113.2
(58) Field of Search .......................... 701/71, 72, 74, 701/75, 48; 303/165, 152, 113.2, 122.11

(56) References Cited

U.S. PATENT DOCUMENTS

| | | | | |
|---|---|---|---|---|
| 5,207,483 A | * | 5/1993 | Shimada et al. | 303/148 |
| 5,234,263 A | * | 8/1993 | Haerr et al. | 303/113.2 |
| 5,334,983 A | * | 8/1994 | Ikeda et al. | 342/70 |
| 5,358,318 A | * | 10/1994 | Ikeda et al. | 303/173 |
| 5,492,394 A | * | 2/1996 | Kusano et al. | 303/113.2 |
| 5,542,756 A | * | 8/1996 | Luckevich et al. | 303/122.11 |
| 5,615,933 A | * | 4/1997 | Kidston et al. | 303/152 |
| 5,669,679 A | * | 9/1997 | Hammoud et al. | 303/165 |
| 5,719,770 A | * | 2/1998 | Matsuno | 701/71 |
| 6,212,460 B1 | * | 4/2001 | Rizzo et al. | |
| 6,226,581 B1 | * | 5/2001 | Reimann et al. | 701/48 |

* cited by examiner

Primary Examiner—Yonel Beaulieu
Assistant Examiner—Olga Hernandez
(74) Attorney, Agent, or Firm—Scott A. McBain

(57) ABSTRACT

A system and method of vehicle stability enhancement control during ABS operation, the method comprising the steps of determining whether ABS mode is active; determining whether VSE is required; calculating a target wheel speed for each wheel if ABS mode is active and VSE is required; calculating an adjusted wheel slip for each wheel by subtracting the wheel speed for each wheel from the target wheel speed for each wheel and dividing the difference by the target wheel speed for each wheel; and determining an ABS control mode for each wheel using the adjusted wheel slip. The method further provides the step of calculating the target wheel speed for each wheel, in which the step of calculating the target wheel speed for each wheel further comprises adding a VSE modification term for each wheel to the vehicle speed to calculate the target wheel speed.

19 Claims, 2 Drawing Sheets

US 6,438,483 B1

SYSTEM AND METHOD FOR VEHICLE STABILITY ENHANCEMENT CONTROL DURING ABS OPERATION

TECHNICAL FIELD

This invention relates generally to the field of control of antilock braking for vehicles, and in particular, to a system and method for vehicle stability enhancement control during ABS operation.

BACKGROUND OF THE INVENTION

Antilock braking systems (ABS) are becoming more common on vehicles, particularly automobiles and light trucks. When the driver applies the brakes, ABS monitors whether a tire is skidding or about to skid, and automatically releases the brakes for a short period, so the wheel is allowed to rotate, rather than skid. The ABS control system controls braking pressure in either an applied, hold, or release state, cycling from one to the other throughout the stop, depending on a wheel's skid condition. Typically, skidding is monitored at each of a vehicle's four wheels by measuring wheel speed and looking for a sudden deceleration, indicating the wheel is no longer rolling, but is stopping and skidding.

Vehicle stability enhancement (VSE) has also become more common on vehicles. VSE reduces vehicle spins and excessive understeer, reducing the difference between the driver's requested direction and the actual vehicle direction. VSE uses various sensors to look at the difference between the driver's requested direction and the yaw rate, and then manages individual wheel braking to bring the vehicle back toward the driver's requested direction.

Although ABS and VSE both improve stopping and handling in certain conditions, they typically work independently of each other. If a driver is turning and ABS is active because of a skid, VSE will take control of the wheel braking and brake pressure modulation. This strategy is largely successful, but has the following disadvantages: large brake pedal movements during VSE control which are potentially alarming to the driver; difficulty in controlling brake pressure, and therefore the wheel, under heavy driver braking while in VSE; and difficulty in smoothly returning control to ABS from VSE, because ABS does not have control or receive wheel information while in VSE.

Accordingly, it would be desirable to have a system and method of vehicle stability enhancement control during ABS operation that overcomes the disadvantages described.

SUMMARY OF THE INVENTION

One aspect of the invention provides a method of vehicle stability enhancement control during ABS operation, comprising the steps of determining whether ABS mode is active; determining whether VSE is required; calculating a target wheel speed for each wheel if ABS mode is active and VSE is required; calculating an adjusted wheel slip for each wheel by subtracting the wheel speed for each wheel from the target wheel speed for each wheel and dividing the difference by the target wheel speed for each wheel; and determining an ABS control mode for each wheel using the adjusted wheel slip.

Another aspect of the invention provides the step of calculating the target wheel speed for each wheel, in which the step of calculating the target wheel speed for each wheel further comprises adding a VSE modification term for each wheel to the vehicle speed to calculate the target wheel speed.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
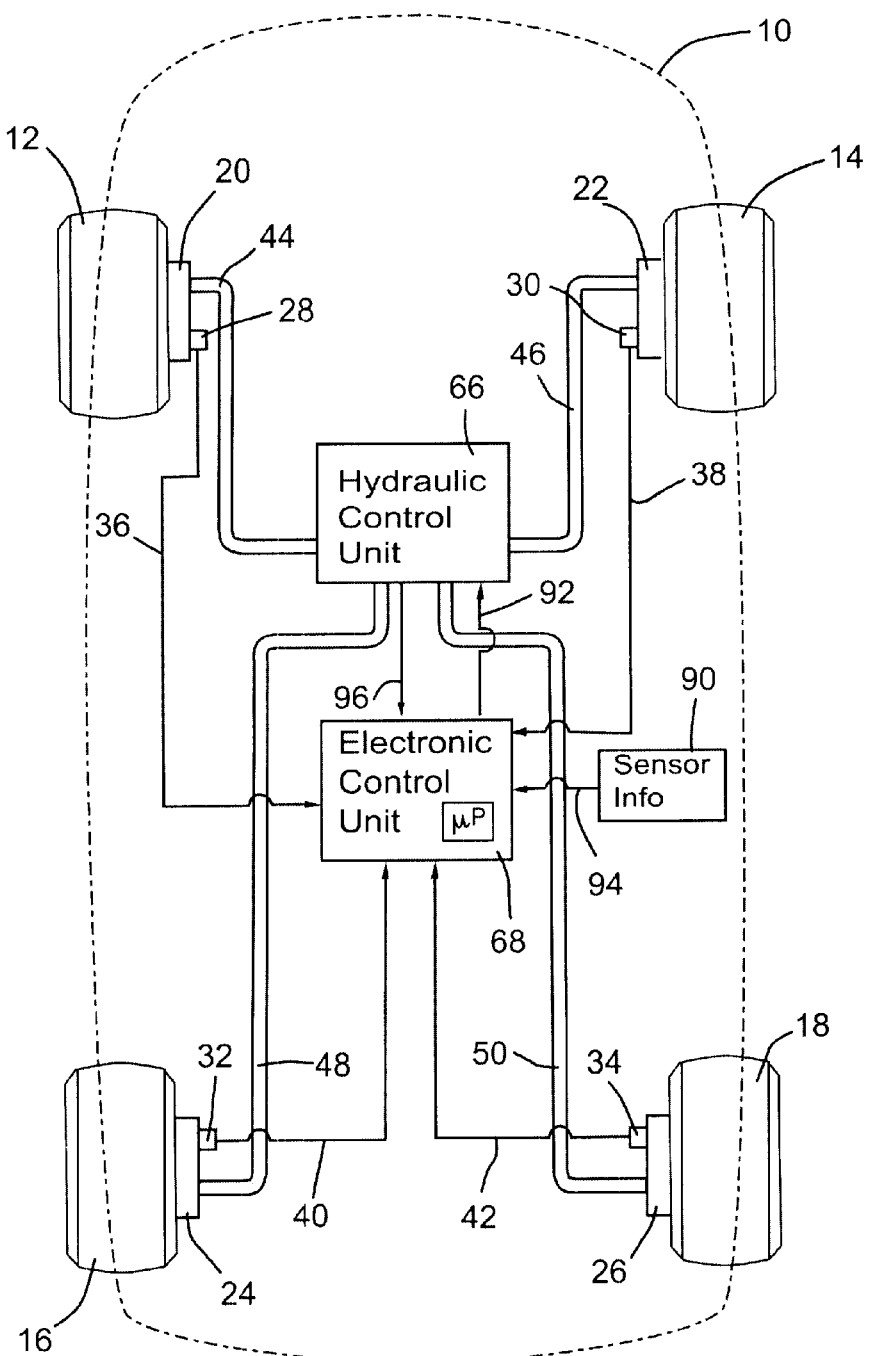
FIG. 1 is a schematic of a preferred embodiment of a system for vehicle stability enhancement control during ABS operation that is made in accordance with the invention.

FIG. 1 is a schematic of a system for vehicle stability enhancement control during ABS operation. Vehicle 10 has wheels 12, 14, 16, and 18 with respective wheel speed sensors 28, 30, 32, and 34. The wheel speed sensors 28, 30, 32, and 34 send respective wheel speed signals 36, 38, 40, and 42 to electronic control unit 68. The electronic control unit 68 may be a computer, microcomputer, or microprocessor, with ROM and RAM and appropriate input and output circuits.

Besides the wheel speed signals 36, 38, 40, and 42, the electronic control unit 68 also receives sensor signals 94 from sensor information 90. Various sensor information 90, including yaw rate, steering wheel position, lateral acceleration, master cylinder pressure, and brake pedal position, may be used to establish vehicle status at the electronic control unit 68 as required by ABS, vehicle stability enhancement (VSE), or traction control systems. The electronic control unit 68 may also receive HCU feedback signal 96 from hydraulic control unit 66.

The electronic control unit 68 is responsive to and processes the wheel speed signals 36, 38, 40, and 42, the sensor signals 94, and the HCU feedback signal 96. The electronic control unit 68 determines the proper ABS state to optimize vehicle braking and sends control signal 92 to the hydraulic control unit 66. The hydraulic control unit 66 uses the control signal 92 to determine brake pressure signals 44, 46, 48, and 50, which control pressure to respective brakes 20, 22, 24, and 26 for the respective wheels 12, 14, 16, and 18. The hydraulic control unit 66 typically comprises pressure control pumps and solenoid operated actuating valves to rapidly change the brake pressure signals 44, 46, 48, and 50.

Figure 2:
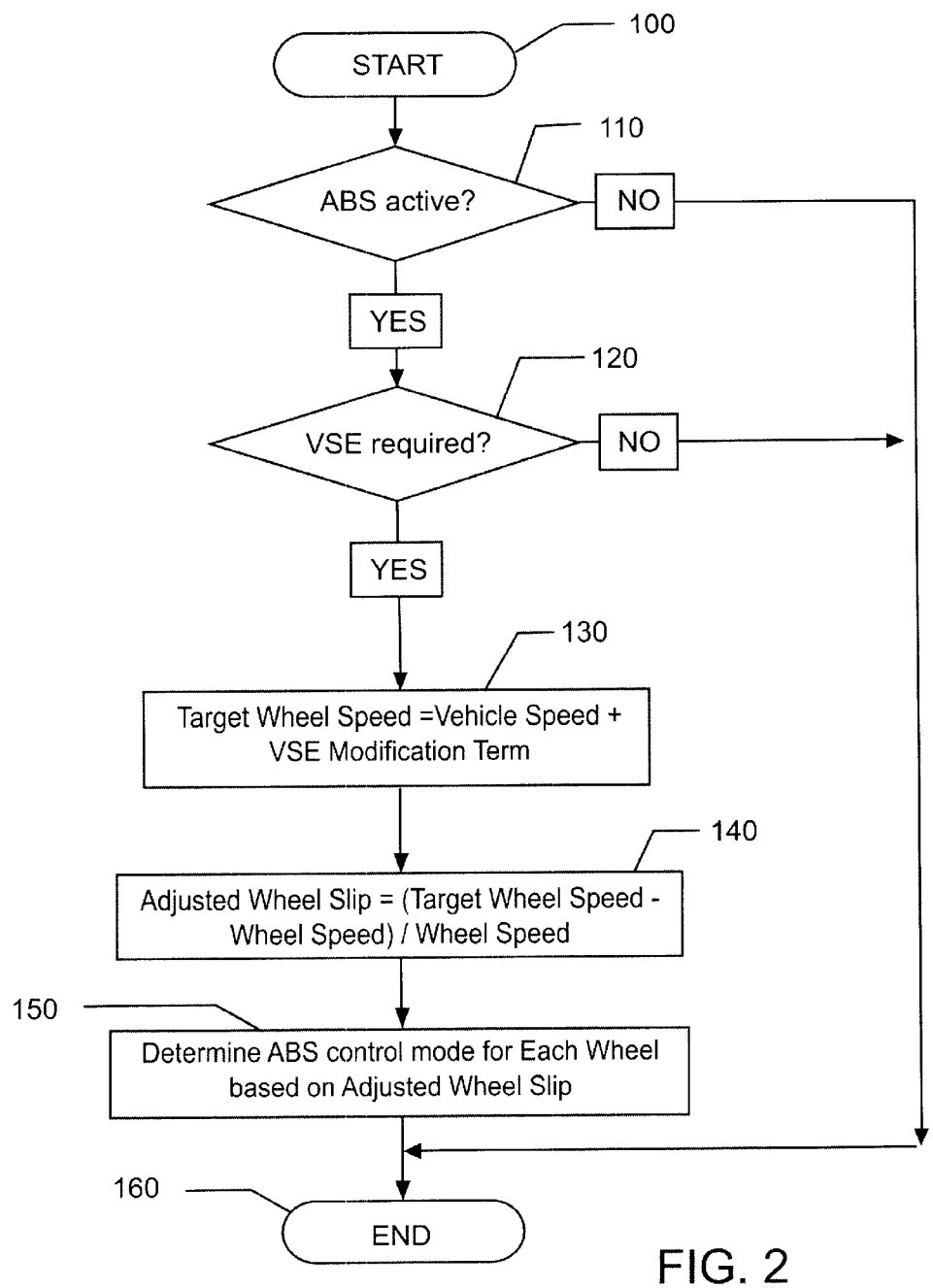
FIG. 2 is a flow chart of a preferred embodiment of a method of vehicle stability enhancement control during ABS operation that is made in accordance with the invention.

FIG. 2 is a flow chart of a method of vehicle stability enhancement control during ABS operation. Programmed circuits, such as microcomputers, microprocessors, etc., or discrete components, can be used to carry out the method. After the 'START' (represented by reference numeral 100) of the program section described, it is determined whether the ABS mode is active (110). If not, the program section ends (160).

If the ABS mode is active, it is determined whether VSE is required (120). If not, the program section ends (160). If VSE is required, a target wheel speed for each wheel is calculated by adding a VSE modification term for each wheel to the vehicle speed (130). The VSE modification term is calculated by a VSE algorithm, which tries to match the driver's requested direction and the yaw rate. The VSE modification term may be positive for one side of the vehicle and negative for the opposite side, so one target wheel speed may be raised while the other is lowered. Because the VSE modification term is calculated for each wheel, the stabilizing effect has components both across the axle and along the vehicle's length. The VSE modification term corresponds to a velocity difference that VSE wants to create across the axle or vehicle's length to stabilize the vehicle.

Prior art systems and methods of vehicle stability enhancement have not made use of the ABS mode to provide vehicle stability enhancement. Also, the differential across an axle has been created by releasing a single wheel, rather than braking one wheel harder and releasing the opposite wheel. An example of such a brake control system is provided by U.S. Pat. No. 5,720,533, assigned to the assignee of this invention.

An adjusted wheel slip for each wheel is calculated by subtracting the wheel speed for each wheel from the target wheel speed for each wheel and dividing the difference by the target wheel speed for each wheel (140).

An ABS control mode is determined for each wheel using the adjusted wheel slip (150). Across the vehicle for each axle, ABS will cycle the wheel on one side more deeply and the wheel on the other side more shallowly, because the adjusted wheel slip is higher on one side of the vehicle than the other. This will create a velocity difference across the vehicle to stabilize it by creating a yaw moment. Along the length of the vehicle, generating more slip on the rear wheels will reduce the lateral capability of the rear tire, reducing understeer. Generating less slip on the rear wheels will increase the lateral capability of the rear tire, reducing vehicle spin. Once the control mode for each wheel has been determined for the first rear wheel, the program section ends (160).

Although the steps of the embodiment above are presented in the preferred order, the steps may be completed in different orders. The steps of determining whether the ABS mode is active and whether VSE is required may be carried out in any order prior to calculating a target wheel speed for each wheel.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for vehicle stability enhancement control during antilock brake system (ABS) operation, comprising the steps of:
    determining whether ABS mode is active;
    determining whether vehicle stability enhancement (VSE) is required;
    calculating a target wheel speed for each wheel if ABS mode is active and VSE is required;
    calculating an adjusted wheel slip for each wheel wherein the slip is increased for at least one wheel for VSE; and
    determining an ABS control mode for each wheel using the adjusted wheel slip.

2. The method of claim 1 wherein the step of calculating the target wheel speed for each wheel further comprises adding a VSE modification term for each wheel to the vehicle speed to calculate the target wheel speed.

3. The method of claim 1 wherein the step of calculating an adjusted wheel slip for each wheel further comprises subtracting the wheel speed for each wheel from the target wheel speed for each wheel and dividing the difference by the target wheel speed for each wheel.

4. The method of claim 2 wherein the VSE modification term for one wheel is positive and the VSE modification term for an opposite wheel is negative.

5. A method for vehicle stability enhancement control during antilock brake system (ABS) operation, comprising the steps of:
    determining whether ABS mode is active;
    determining whether vehicle stability enhancement (VSE) is required;
    calculating a target wheel speed for each wheel by adding a VSE modification term for each wheel to the vehicle speed to calculate the target wheel speed wherein the VSE modification term for one wheel is positive and the VSE modification term for an opposite wheel is negative if ABS mode is active and VSE is required;
    calculating an adjusted wheel slip for each wheel; and
    determining an ABS control mode for each wheel using the adjusted wheel slip.

6. A method for vehicle stability enhancement (VSE) control during antilock brake system (ABS) operation, comprising the steps of:
    determining whether ABS mode is active;
    determining whether VSE is required;
    calculating a target wheel speed for each wheel if ABS mode is active and VSE is required;
    calculating an adjusted wheel slip for each wheel by subtracting the wheel speed for each wheel from the target wheel speed for each wheel and dividing the difference by the target wheel speed for each wheel; and
    determining an ABS control mode for each wheel using the adjusted wheel slip.

7. A computer readable medium storing a computer program for vehicle stability enhancement VCU control during antilock brake system ABS operation, said computer program comprising:
    computer readable code for determining whether ABS mode is active;
    computer readable code for determining whether VSE is required;
    computer readable code for calculating a target wheel speed for each wheel if ABS mode is active and VSE is required;
    computer readable code for calculating an adjusted wheel slip for each wheel wherein the slip is increased for at least one wheel for VSE; and
    computer readable code for determining an ABS control mode for each wheel using the adjusted wheel slip.

8. The computer readable medium of claim 5, wherein the computer readable code for calculating the target wheel speed for each wheel further comprises computer readable code for adding a VSE modification term for each wheel to the vehicle speed to calculate the target wheel speed.

9. A computer readable medium storing a computer program for vehicle stability enhancement (VSE) control during antilock brake system (ABS) operation, said computer program comprising:
    computer readable code for determining whether ABS mode is active;

computer readable code for determining whether VSE is required;

computer readable code for calculating a target wheel speed for each wheel adding a VSE modification term for each wheel to the vehicle speed to calculate the target wheel speed wherein the VSE modification term for one wheel is positive and the VSE modification term for an opposite wheel is negative if ABS mode is active and VSE is required;

computer readable code for calculating an adjusted wheel slip for each wheel; and computer readable code for determining an ABS control mode for each wheel using the adjusted wheel slip.

10. A computer readable medium storing a computer program for vehicle stability enhancement (VSE) control during antilock brake system (ABS) operation, said computer program comprising:

computer readable code for determining whether ABS mode is active;

computer readable code for determining whether VSE is required;

computer readable code for calculating a target wheel speed for each wheel if ABS mode is active and VSE is required;

computer readable code for calculating an adjusted wheel slip for each wheel by subtracting the wheel speed for each wheel from the target wheel speed for each wheel and dividing the difference by the target wheel speed for each wheel; and computer readable code for determining an ABS control mode for each wheel using the adjusted wheel slip.

11. A system for vehicle stability enhancement (VSE) control during antilock brake system (ABS) operation, comprising:

means for determining whether ABS mode is active;

means for determining whether VSE is required;

means for calculating a target wheel speed for each wheel if ABS mode is active and VSE is required;

means for calculating an adjusted wheel slip for each wheel wherein the slip is increased for at least one wheel for VSE; and means for determining an ABS control mode for each wheel using the adjusted wheel slip.

12. The system of claim 11, wherein the means for calculating the target wheel speed for each wheel further comprises a means for adding a VSE modification term for each wheel to the vehicle speed to calculate the target wheel speed.

13. The system of claim 12 wherein the VSE modification term for one wheel is positive and the VSE modification term for an opposite wheel is negative.

14. The system of claim 11, wherein the means for calculating the target wheel speed for each wheel further comprises a means for adding a VSE modification term for each wheel to the vehicle speed to calculate the target wheel speed.

15. A system for vehicle stability enhancement (VSE) control during antilock brake system (ABS) operation, comprising:

means for determining whether ABS mode is active;

means for determining whether VSE is required;

means for calculating a target wheel speed for each wheel and for adding a VSE modification term for each wheel to the vehicle speed to calculate the target wheel speed wherein the VSE modification term for one wheel is positive and the VSE modification term for an opposite wheel is negative if ABS mode is active and VSE is required;

means for calculating an adjusted wheel slip for each wheel; and means for determining an ABS control mode for each wheel using the adjusted wheel slip.

16. A system for vehicle stability enhancement (VSE) control during antilock brake system (ABS) operation, comprising:

means for determining whether ABS mode is active;

means for determining whether VSE is required;

means for calculating a target wheel speed for each wheel if ABS mode is active and VSE is required;

means for calculating an adjusted wheel slip for each wheel by subtracting the wheel speed for each wheel from the target wheel speed for each wheel and dividing the difference by the target wheel speed for each wheel; and means for determining an ABS control mode for each wheel using the adjusted wheel slip.

17. The computer readable medium of claim 8 wherein the VSE modification term for one wheel is positive and the VSE modification term for an opposite wheel is negative.

18. The computer readable medium of claim 7, wherein the computer readable code for calculating an adjusted wheel slip for each wheel further comprises computer readable code for subtracting the wheel speed for each wheel from the target wheel speed for each wheel and dividing the difference by the target wheel speed for each wheel.

19. The computer readable medium of claim 17, wherein the computer readable code for calculating an adjusted wheel slip for each wheel further comprises computer readable code for subtracting the wheel speed for each wheel from the target wheel speed for each wheel and dividing the difference by the target wheel speed for each wheel.

* * * * *